(12) United States Patent
Lee

(10) Patent No.: US 9,516,221 B2
(45) Date of Patent: Dec. 6, 2016

(54) APPARATUS AND METHOD FOR PROCESSING IMAGE IN CAMERA DEVICE AND PORTABLE TERMINAL USING FIRST AND SECOND PHOTOGRAPHING INFORMATION

(71) Applicant: Samsung Electronics Co., Ltd., Gyeonggi-do (KR)

(72) Inventor: Yonggu Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 14/035,264

(22) Filed: Sep. 24, 2013

(65) Prior Publication Data

US 2014/0104455 A1   Apr. 17, 2014

(30) Foreign Application Priority Data

Oct. 12, 2012  (KR) .......................... 10-2012-0113295

(51) Int. Cl.
*H04N 5/76* (2006.01)
*H04N 5/232* (2006.01)

(52) U.S. Cl.
CPC ...... *H04N 5/23232* (2013.01); *H04N 5/23245* (2013.01); *H04N 5/76* (2013.01)

(58) Field of Classification Search
CPC .................................................. H04N 5/23293
USPC ........................................... 348/231.6, 222.1
See application file for complete search history.

(56) References Cited

U.S. PATENT DOCUMENTS

| 2005/0078197 | A1 | 4/2005 | Gonzalez |
| 2008/0088858 | A1 | 4/2008 | Marcu et al. |
| 2011/0261228 | A1* | 10/2011 | Peng et al. ................. 348/231.6 |

OTHER PUBLICATIONS

"Digital Negative (DNG) Specification", Version 1.4.0.0, Jun. 2012, Adobe Systems Incorporated, XP-002718882.

* cited by examiner

*Primary Examiner* — Usman Khan
(74) *Attorney, Agent, or Firm* — The Farrell Law Firm, P.C.

(57) ABSTRACT

A method for processing an image in a camera device includes processing a preview image in which first photographing information for controlling a camera drive in a preview mode and second photographing information collected in the image processing are obtained, and both photographing information is stored with a corresponding frame image; and processing a still image in which a specific frame image selected from the frame images stored in a buffer is processed by using the corresponding photographing information during a capture mode.

23 Claims, 14 Drawing Sheets

APPARATUS AND METHOD FOR PROCESSING IMAGE IN CAMERA DEVICE AND PORTABLE TERMINAL USING FIRST AND SECOND PHOTOGRAPHING INFORMATION

CROSS RELATED APPLICATION

This application claims the benefit under 35 U.S.C. §119 (a) of a Korean patent application filed on Oct. 12, 2012 in the Korean Intellectual Property Office and assigned Serial No. 10-2012-0113295, the entire disclosure of which is hereby incorporated by reference.

BACKGROUND

1. Field of the Invention

The present invention relates to an apparatus and a method for processing an image in a camera device and, more particularly, to an apparatus and a method for processing an image obtained by using photographing information.

2. Description of the Related Art

Both a camera device and a portable terminal are equipped with a camera function to provide a high definition image and various user functions.

In operation, the camera device displays an image detected by a camera sensor as a preview image, and stores the image obtained by the camera sensor if a user presses a shutter button. When processing the image obtained by the camera, the camera device optimizes the image according to the brightness of the image.

However, the image obtained by the above method cannot be processed by using photographing information, such as lens and aperture information, flash information, actuator information, orientation information, and etc., at the time of photographing. This is because a delay is generated between the photographing an image and the processing time of the camera image in the camera device. Due to the delay, the real-time photographing information of the camera cannot be considered to enhance the image quality, and thus the image cannot be processed optimally. Here, one frame difference, for example, is caused between the image photographed by the camera and the image processed by an image processing unit of the camera.

As described above, when a user presses a shutter button (shutter-on) of the camera device, a time delay (shutter delay or shutter lag) exists between detecting an image and capturing the image in the camera. Namely, a time difference exists between a user's shutter-on activity and a photographing activity of a subject by a camera sensor, and this time difference may be generated depending on the photographing environment of the subject and the processing time of an image processor.

SUMMARY

The present invention suggests an apparatus and a method enabling to process an image by using photographing information at the time of photographing the image in a camera device.

The present invention suggests an apparatus and a method enabling to buffer both photographing information used at the time of photographing and information extracted from an image processing, such as metadata, in an identical frame of an image, and to process the buffered image by using the photographing information in a camera device to enhance the optimum quality of image.

The present invention suggests an apparatus and a method enabling to process an image by using a control variable, lens and aperture information, flash information, actuator information, and information of sensors like a gyro sensor, at the same time of photographing the image in a high resolution camera device.

An apparatus for processing an image in a camera device according to an exemplary embodiment of the present invention includes: a camera capturing an image according to first photographing information; a buffer storing a plurality of frame images; an image processor processing the image captured by the camera during a preview mode, obtaining second photographing information when processing the image captured by the camera; and a control unit outputting the first photographing information during the preview mode, storing the first photographing information and the second photographing information with the corresponding frame image in the buffer, and outputting a predetermined frame image and the corresponding the first and second photographing information to the image processor during a capture mode.

A method for processing an image in a camera device according to another exemplary embodiment of the present invention includes: processing a preview image in which first photographing information for controlling a camera drive during a preview mode and second photographing information obtained when processing the preview are obtained; storing the first and second photographing information in a corresponding frame image of a buffer; and processing a still image in which a specific frame image selected from the buffer is processed by using the first and second photographing information during a capture mode.

An apparatus for processing an image in a portable terminal according to another exemplary embodiment of the present invention includes: a camera capturing an image according to first photographing information; a buffer for storing a plurality of frame images output by the camera; an image processor, operatively coupled to the buffer, configured for processing the image output by the camera during a preview mode, obtaining second photographing information from processing the image, storing a specific frame image with the corresponding first and second photographing information in the buffer, and processing a still image by using the first and second photographing information of the corresponding frame during a capture mode; and a controller controlling the preview mode and the capture mode of the image processor and controlling the display to display an image output by the image processor.

An apparatus for processing an image in a camera device according to another exemplary embodiment of the present invention includes: a camera capturing an image according to first photographing information; an input unit generating signals of a preview mode and a capture mode; an image processor, operatively coupled to a buffer, configured for storing a plurality of frame images, obtaining second photographing information when processing the image output by the camera during a preview mode, storing a specific frame image with the first and second photographing information in the buffer, and processing the image output by the buffer to a still image by using the first and second photographing information of the corresponding frame image during a capture mode; a storage unit storing the still image output by image processor; and a display unit displaying the still image under the control of the image processor.

The present invention provides a method of using metadata so that raw data stored in a buffer of a high resolution camera can be optimally tuned.

BRIEF DESCRIPTION OF THE DRAWINGS

The features and advantages of the present invention will be more apparent from the following detailed description in conjunction with the accompanying drawings, in which.

DETAILED DESCRIPTION

Figure 1:
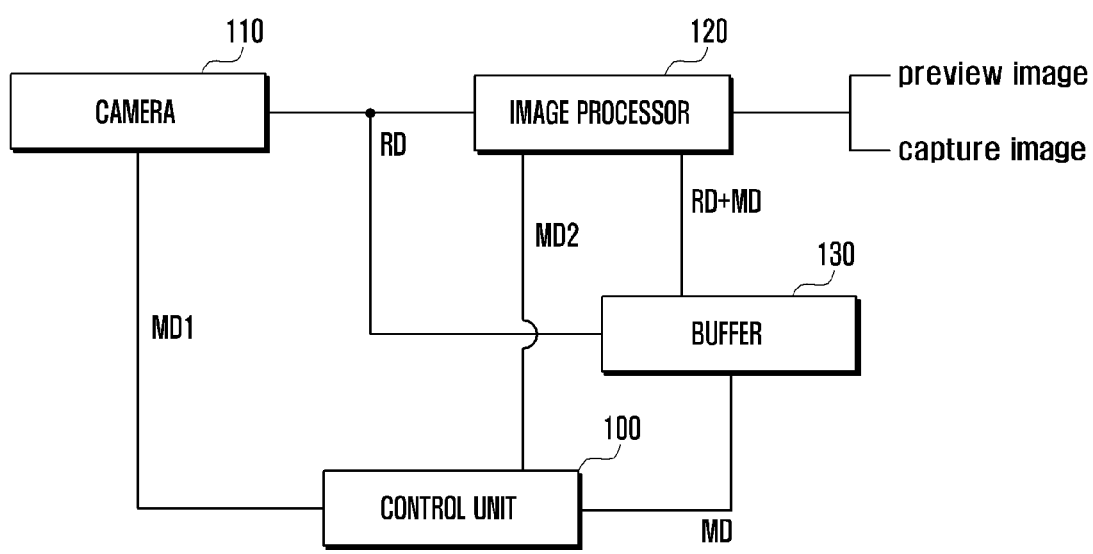
FIG. 1 is a block diagram to explain an operation of a camera device according to an exemplary embodiment of the present invention.

Hereinafter, exemplary embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

Briefly, a camera device has a delay time (shutter lag), which represents a predetermined period of time for the light to pass, between a shutter-on point and an image obtaining point. Accordingly, a camera device according to an exemplary embodiment of the present invention provides a buffer or a storage medium for storing full resolution images captured by a camera independently from a display image, and buffers the full resolution images in the buffer while driving the camera. When photographing is requested, a zero shutter lag can be achieved by selecting a frame image requested for photographing from an earlier buffered frame images. In the exemplary embodiment of the present invention, the buffer is configured with a size of storing a predetermined number of frame images, and the size of frame may be set enough to eliminate the shutter lag. Generally, the shutter lag is generated if the number of frames for buffering is about 2 frames, and thereby may be set to less than 5 frames. That is, when capturing an image, there is a typically about 3 frame delays, so by buffering about 5 frames at a time during a preview mode, the camera can go back and retrieve an earlier frame being buffered to compensate for the delay time when processing the image. In addition, according to the teaching of the present invention, the buffer may have a ring buffer structure for storing frame images and photographing information by each frame. When processing an image (raw data) stored in the buffer, the image processor processes the image (raw data) after setting the photographing information (metadata) buffered in an identical frame. Here, the photographing information may include a first photographing information generated by a camera unit of a terminal and a second photographing information generated by an image processor of a terminal. That is, both the first and second photographing information (metadata) corresponding to the image at the time of capturing an image is stored in a frame. Thereafter, the processing an image using both the first and second photographing information may be performed through a postprocessor of the image processor, as explained in details later.

Hereinafter, camera control information and photographing information obtained from the camera is called first photographing information (metadata 1, MD1), and information extracted from the image processor (for example, preprocessor) is called second photographing information (metadata2, MD2). Photographing information generated by integrating the first photographing information MD1 and the second photographing information MD2 is called integrated photographing information (integrated metadata, MD). Further, an image obtained by the camera is called row data (RD). Hereinafter, a term 'full resolution image' represents an image obtained by a camera, which is not scaled. A term 'display image' represents an image or a moving image displayed by a display unit in a preview mode, which is scaled to a predetermined size (or resolution) from an image obtained by a camera. In the case of display image, the resolutions of preview image and moving image may be same or different. A term 'captured image' represents an image stored as a still image, and may be an image obtained by the camera or an image scaled to a predetermined size from a full resolution image obtained by the camera. In the exemplary embodiment of the present invention, the captured image is assumed to be a full resolution image of the camera.

An image processor of the camera according to an exemplary embodiment of the present invention may include a buffer configured with a plurality of frame buffers storing frame data. Frame images corresponding to each frame buffer in a preview mode, first photographing information of the camera obtained from an identical frame, and second photographing information obtained from the image processor are stored together. A still image is processed by using photographing information corresponding to an image stored in a selected frame buffer.

In this disclosure, photographing information obtained in the preview mode may include a sensor control variable, lens and aperture information, flash information, actuator information (Bv, Ev, Sv, Tv, Av, analog gain, digital gain, lens shading correction parameter, frame counter, time stamp, flash on/off, AE target, lens position, edge value, white balance gain, and color temperature information), and sensor information of sensors such as gyro sensor.

When processing an AE (automatic exposure) bracketing and AWB (auto white balance) bracketing in a capture mode, a sensor may be set to a continuous frame mode, raw data applied by a setting value may be stored in a ring buffer with metadata described above, and a control unit may continuously process images taken in the bracket photographing by using corresponding photographing information (metadata) and the stored raw data. Further, a compression ratio of JPEG may be adjusted by using an edge value of photographing information (metadata) stored in the buffer (ring buffer). Alternatively, only data desired by a user may be processed by using a time stamp or frame counter of the photographing information (metadata) stored in the buffer (ring buffer).

FIG. 1 is a block diagram to explain an operation of a camera device according to an exemplary embodiment of the present invention.

Referring to FIG. 1, the camera 110 performs a function of obtaining an image through an internal sensor while driving the camera. The image obtained by the camera 110 is a raw image as an image having a full resolution of the image sensor. The control unit 100 outputs information for controlling the drive of the camera 110, and obtains photographing information of the image obtained by the camera 110, such as a frame counter and a time stamp. Here, the information for controlling the drive of the camera 110 and the photographing information obtained from the camera 110 may be first photographing information MD1. The control unit 100 stores the image obtained by the camera 110 in a buffer 130, and buffers the first photographing information MD1.

The image output by the camera 110 is processed by an image processor 120, and photographing information obtained in the image processing is transmitted to the control unit 100. Here, the photographing information obtained by the image processor 120 may be second photographing information MD2. The image processed by the image processor 120 is a preview image, which is displayed in a display unit (not shown).

If the second photographing information MD2 is received from the image processor 120, the control unit 100 generates integrated photographing information MDT by integrating the first photographing information MD1 and the second photographing information MD2, and the integrated photographing information is stored with a corresponding frame image in the buffer 130. Note that the second photographing information MD2 may be obtained from another frame section differently from the first photographing information MD1. Namely, at the time of obtaining an image by the camera 110, the image processor 120 processes an image obtained from a previous frame. Accordingly, a frame difference exists between the first photographing information MD1 and the second photographing information MD2.

If capturing an image is requested by a user, the control unit 100 accesses a frame image of zero shutter lag (i.e., an earlier frame being stored to realize the zero shutter lag) and integrated photographing information associated with the frame image from the buffer 130, and outputs them to the image processor 120. The image processor 120 then processes the image by using the integrated photographing information, and stores the image. Accordingly, the image processor 120 processes an image by using photographing information obtained from an identical frame (or an earlier frame) stored in a buffer and providing zero shutter lag effect while processing a captured image, and thereby can tune the image to an optimized still image.

Figure 2:
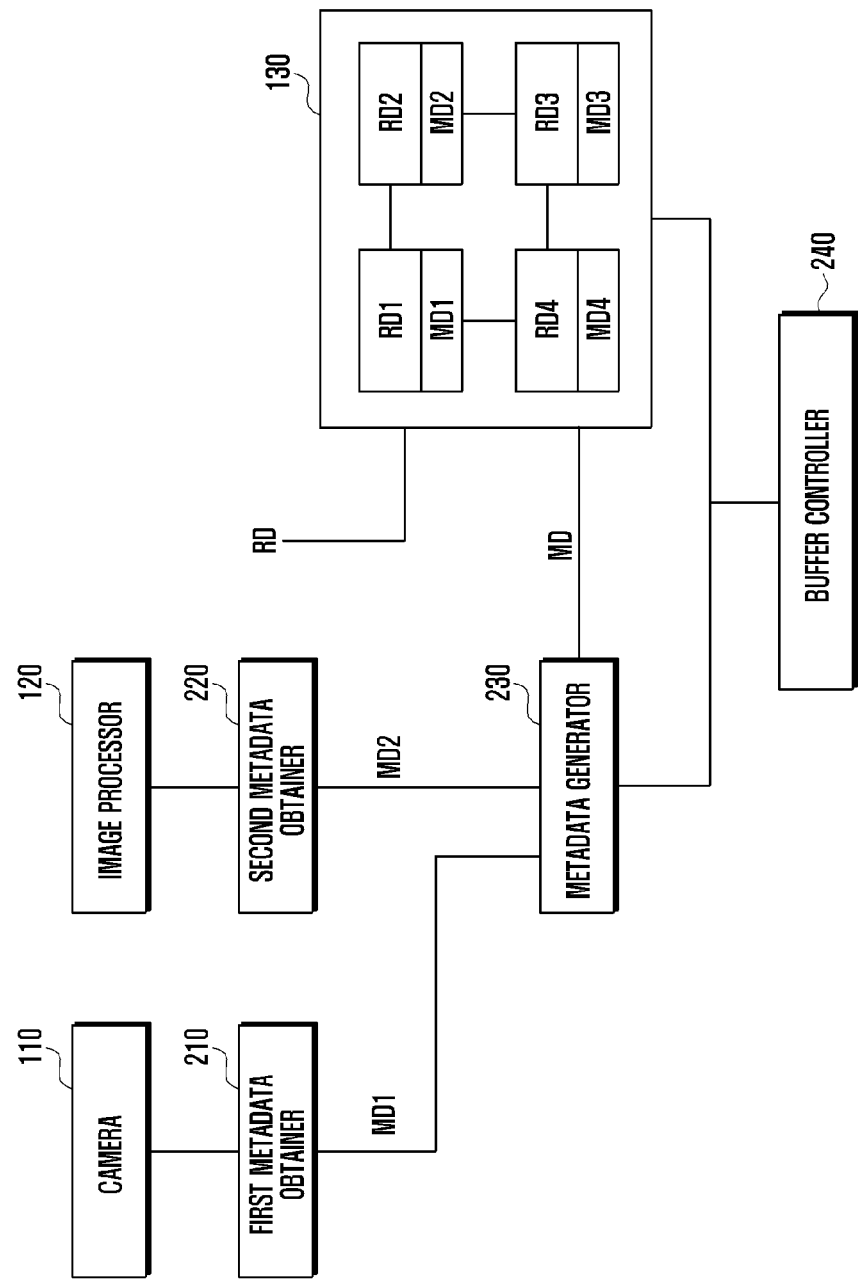
FIG. 2 is a block diagram showing a configuration of a camera device obtaining photographing information according to an exemplary embodiment of the present invention.
Figure 3:
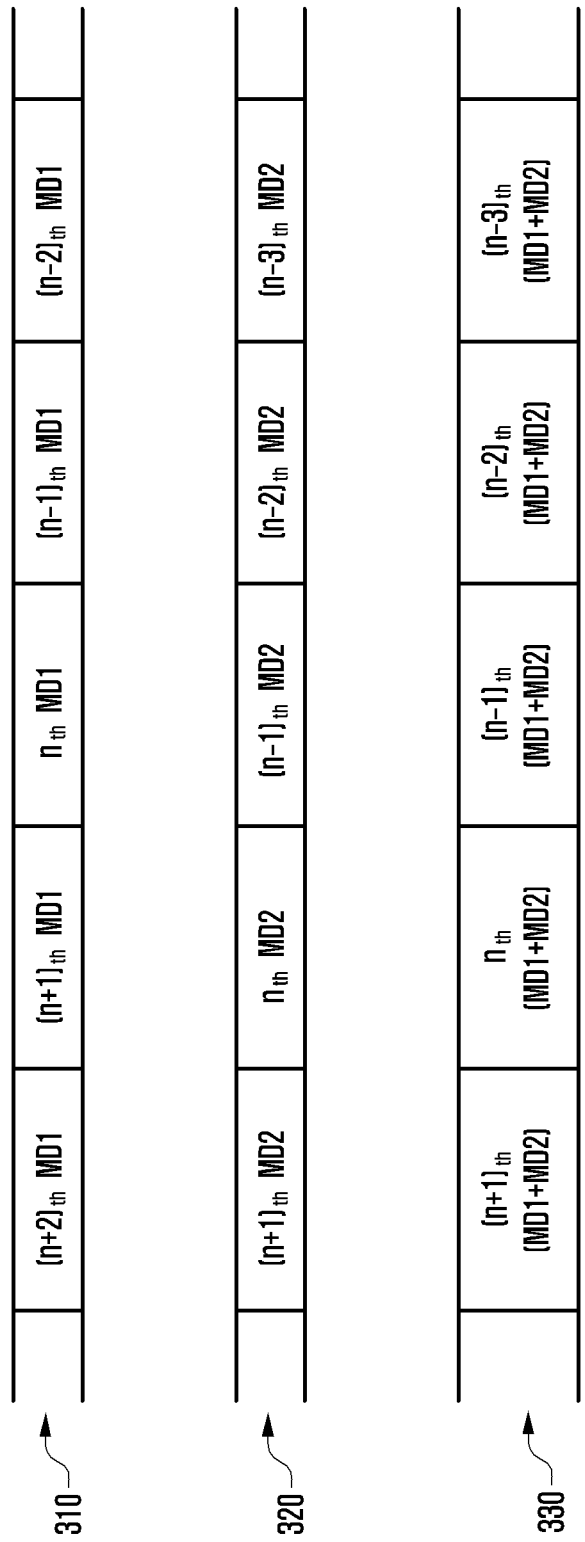
FIG. 3 illustrates an operation of storing photographing information obtained by an image processor in a buffer of a camera.

FIG. 2 is a block diagram showing a configuration of a camera device obtaining photographing information according to an exemplary embodiment of the present invention, and FIG. 3 illustrates an operation of storing photographing information obtained by an image processor in a buffer of a camera.

Referring to FIGS. 2 and 3, the control unit 100 outputs control information, such as a time stamp and a frame counter value, for controlling the drive of the camera 110, and in turn the camera 110 obtains an image by using the control information output by the control unit 100, then outputs the obtained image to the image processor 120. The camera 110 generates a frame count value and a time stamp of an image obtained from each frame. Here, the first photographing information may include control information for the camera 110 output by the control unit 100 and frame image information generated by the camera 110.

The control unit 100 stores an image output by the camera 110 in a buffer 130. The buffer 130 is configured with a ring buffer storing a plurality of frame images, and the size of the buffer 130 is set to a size enough to compensate a shutter lag in the camera device. For example, if the shutter lag or delay corresponds to about 3 frames, then the size of the buffer 130 can be set to accommodate 5 frames. In the exemplary embodiment of the present invention, the buffer 130 stores photographing information related to a corresponding frame image under the control of the control unit 100.

The image processor 120 processes the image output by the camera 110. The image processor 120 may include a preprocessor and a postprocessor, and the preprocessor performs extraction of 3A (AWB (auto white balance), AE (auto exposure), and AF (Auto focusing)) and performs compensation of image when processing the image output by the camera 130. The information such as an extracted 3A may be used by the postprocessor. The postprocessor performs color compensation and color transformation by using the photographing information. Accordingly, the image processor 120 extracts second photographing information in the image processing, which is used in post-processing.

Firstly, the first photographing information and a method of obtaining the first photographing information are described hereinafter.

The control unit 100 controls an exposure time (Tv), gains (analog gain and digital gain), and frame rate of a sensor of the camera 110 so that the sensor performs an automatic brightness adjustment for every frame, and controls aperture stops (Av) if an aperture is installed. If an autofocus function is provided, the control unit 100 controls a location of lens for an optimal focus and a drive of flash light. Here, the photographing information may be first photographing information output by the camera 110. The camera 110 generates a time stamp and a frame counter value for every frame, and the control unit 100 uses the time stamp and frame counter value output by the camera 110 as first photographing information. If external sensors, such as a gyro sensor, acceleration sensor, GPS receiver, and altitude sensor, are installed in the camera device, the control unit 100 may read sensor values at the time of obtaining an image, and use them as first photographing information.

Secondly, the second photographing information and a method of obtaining the second photographing information are described hereinafter.

The image processor 120 extracts brightness information (Bv, Ev) and high-frequency information of an image for every frame which are obtained from an internal lens shading correction parameter and 3A statics while processing a frame image output by the camera 110. The high-frequency information may be used as an AF filtering value. The high-frequency information may be obtained from a whole image, a block or line divided into a plurality of area, or specific area. The image processor 120 extracts a white balance gain (red and blue gains) value used for white balancing. The photographing information extracted as above may be second photographing information.

The control unit 100 integrates the second photographing information extracted by the image processor 120 with the first photographing information and stores them as integrated photographing information in a corresponding frame image stored in the buffer 130. Namely, the control unit 100 generates metadata by integrating the extracted information such as a Bv, Ev, Sv, Tv, Av, analog gain, digital gain, frame counter, time stamp, flash on/off, AE target, lens position, edge value, and white balance gain, or any combination thereof, and stores the generated metadata in the buffer 130 with the same index as that of raw data of a corresponding frame.

Here, the first photographing information of frame image and the second photographing information may be generated from different frame sections. For example, as shown in FIG. 3, the first photographing information is obtained from frame section 310, and may be obtained from the same section as a corresponding frame image section. However, the second photographing information is obtained at a time different from obtaining the first photographing information by the image processor 120. For example, if the processing time of an image in the image processor 120 has 1 frame delay, the first photographing information and the second photographing information for an identical frame image become to have 1 frame difference shown as 310 and 320 of FIG. 3.

In FIG. 2, photographing information obtainers 210 and 220, photographing information generator 230, and buffer controller 240 may be configured into the control unit 100. Here, the photographing information generator 230 generates photographing information shown as 330 of FIG. 3 by integrating the first photographing information related to the drive of camera 110 and the second photographing information obtained by the image processor 120, and stores them in a corresponding frame image of the buffer 130 under the control of the buffer controller 240. In the exemplary embodiment of the present invention, the integrated photographing information is generated by synthesizing the first photographing information related to the drive of camera 110 and the second photographing information obtained by the image processor 120, and then both are stored in an identical frame image. Here, storing the photographing information in the buffer 130 may be performed in various methods. An image photographed by the camera 110 is stored in the buffer 130, integrated photographing information is generated by integrating the first photographing information with the second photographing information when the second photographing information is obtained, and the integrated photographing information is stored in a corresponding frame image. Alternatively, the first photographing information is stored in the buffer 130 with an image photographed by the camera 110, and the second photographing information is stored in a corresponding frame image when the second photographing information is obtained. In the exemplary embodiment of the present invention, it is assumed that the photographing information is stored in the former method for illustrative purposes.

Figure 4:
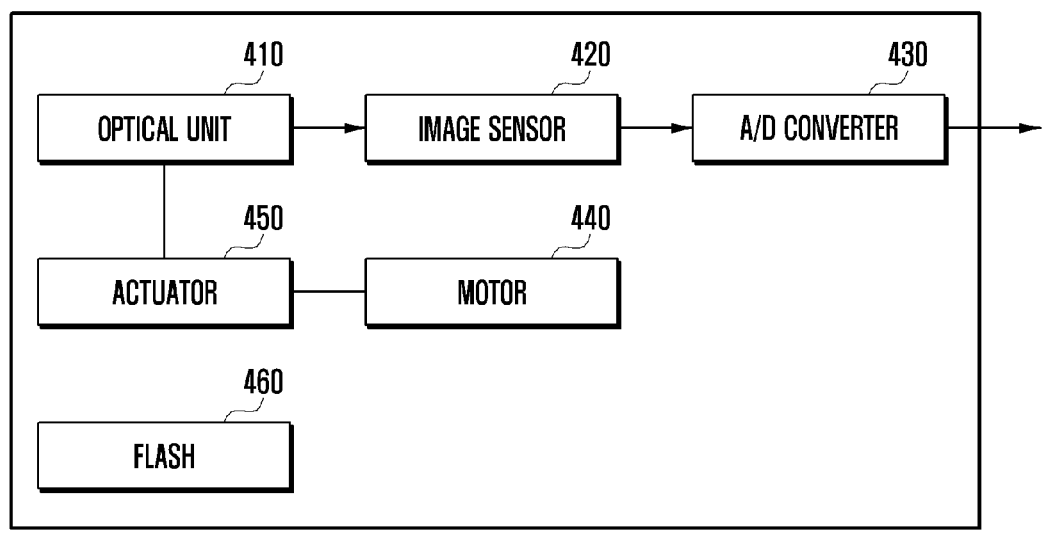
FIG. 4 is a block diagram showing a configuration of the camera of FIG. 1.

FIG. 4 is a block diagram showing a configuration of the camera of FIG. 1.

Referring to FIG. 4, an optical unit 410 is driven by a mechanical shutter, motor 440, and actuator 450, and zooming and focusing operations are performed by the actuator 450. The optical unit 410 receives reflected light of a subject, and the image sensor 420 detects the light received by the optical unit 410 and converts it to an electric signal. Here, the image sensor 420 may be a CMOS sensor or a CCD sensor, and may be a high resolution image sensor. The image sensor 420 of camera may be internally installed with a global shutter. The global shutter performs a function similar to that of a mechanical shutter integrated in a sensor. The camera 110 may be further equipped with a viewfinder.

In the exemplary embodiment of the present invention, the image sensor 420 may be a sensor detecting an image of higher than a UHD (Ultra High Definition) class. The image detected by the image sensor 420 is output by converting to a digital image through an A/D converter 430. Data output by the camera 110 may be Bayer data (raw data). The camera 110 further includes a flash light 460, and drives the flash light 460 at the time of obtaining an image if a signal for driving the flashlight 460 is received.

Figure 5:
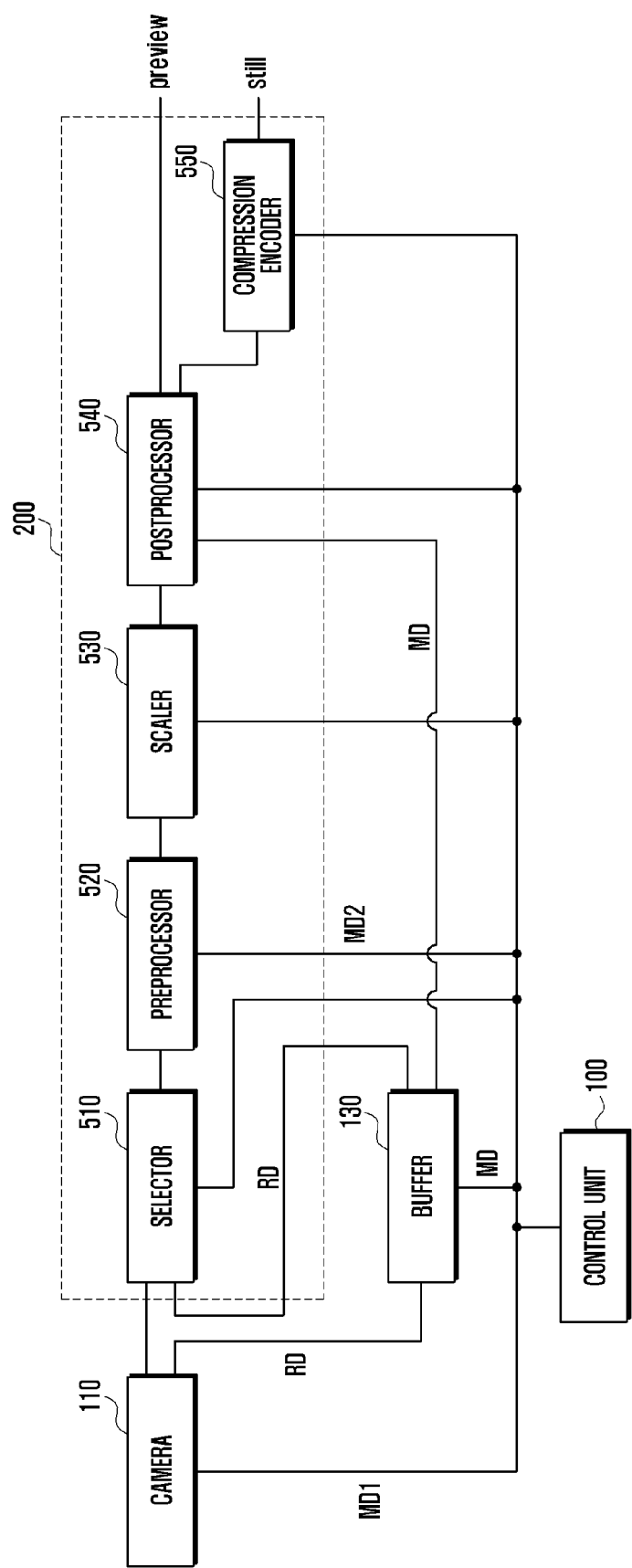
FIG. 5 is a block diagram showing a configuration for generating photographing information and processing an image by using the generated photographing information according to a first exemplary embodiment of the present invention.

FIG. 5 is a block diagram showing a configuration for generating photographing information and processing an image by using the generated photographing information according to a first exemplary embodiment of the present invention.

Referring to FIG. 5, if a user generates a camera drive command, the control unit 100 drives the camera device in a preview mode. In the preview mode, the control unit 100 controls a selector 510 so that the output from the camera 110 is transmitted to a preprocessor 520, and sets the preprocessor 520, scaler 530, and postprocessor 540 to process a display image.

In the preview mode, the control unit 100 drives the camera 110 by outputting first photographing information including setting information of the camera 110 having the configuration of FIG. 4. The camera 110 performs setting of optical unit according to the first photographing information, and obtains and outputs an image according to the setting of the photographing information. The camera 110 then outputs a time stamp and a frame counter corresponding to the obtained image. Here, the image output by the camera 110 may be a full resolution Bayer image of the camera 110, and the image is transmitted to the preprocessor 520 through the selector 510 and stored in the buffer 130 at the same time under the control of the control unit 100. The control unit 110 then generates first photographing information by using control information for driving the camera 110 and information extracted from the camera 110 while obtaining an image.

The preprocessor 520 receives an image output by the camera 110 through the selector 510 and preprocesses the image. The preprocessor 520 extracts 3A (AWB (auto white balance), AE (auto exposure), and AF (Auto focusing)) from the frame image, and performs less shading compensation, dead pixel correction, and knee correction. The preprocessed image is a full resolution image, and each image is transmitted to the image scaler 530. The preprocessor 520 further extracts second photographing information and outputs it to the control unit 100. As stated earlier, the integrated photographing information is generated by synthesizing the first photographing information related to the drive of camera 110 and the second photographing information obtained by the image processor 120, and then both are stored in an identical frame image when being stored in a buffer.

The scaler 530 scales the received full resolution image to a size for displaying in a display unit. Here, the image scaling may be performed by using at least one of various methods such as resizing, decimation, interpolation, cropping, addition and average calculation. The scaler 530 scales the full resolution image obtained by the camera 110 to a proper size for displaying in the display unit by decreasing the number of pixels, and can also scale so that the image fits to a screen ratio of the display unit.

The image scaled as above is post-processed by the postprocessor 540. The postprocessor 540 performs functions, such as color interpolation, noise reduction, gamma correction, and color transformation, by using the photographing information. Namely, pixel data is converted to data including RGB components by performing the color interpolation, noise of the color interpolated pixel data is reduced, and the data is converted to YUV data. Here, a display image post-processed by the postprocessor 540 is displayed in the display unit.

The buffer 130 buffers images (raw images) of the camera 110 and photographing information is generated by the control unit 100 for every frame. The buffer 130 has a ring buffer structure which can buffer a predetermined number of frame images and photographing information of corresponding frames. Namely, the buffer 130 has a structure of N ring buffers to store N frame images and photographing information. Frame images and information generated from each frame are sequentially buffered from the first ring buffer under the control of the control unit 100, and the control unit 100 overwrites the first ring buffer if the last buffer is filled with a frame image and photographing information. If a shutter delay (shutter lag) is assumed to be 3 frames, the buffer 130 may be configured with a ring buffer handling not less than 3 frame images and corresponding photographing information. In the preview mode, the control unit 100 controls the buffer 130 to buffer frame images and corresponding photographing information for every frame but does not drive a compression encoder 550.

If a user's signal requesting for capturing an image is detected in the preview mode, the control unit 100 selects an output of the buffer 130 by controlling the selector 510, and controls the preprocessor 520 and the postprocessor 540 to process the image stored in the buffer 130 (for example, full resolution image of the camera 110). At this moment, the scaler 530 is not driven and the output of the preprocessor 520 is bypassed to the postprocessor 540. The compression encoder 550 is then activated to generate a still image which is compressed and encoded.

The control unit 100 controls the buffer 130 to output an earlier image (this is for compensation of shutter lag at the time of the user's shutter-on action) and corresponding photographing information according to the request for capturing an image. The control unit 100 further controls so that the frame image output by the buffer 130 is transmitted to the preprocessor 520 and the photographing information is transmitted to the postprocessor 540.

In a capture mode, the control unit 100 accesses a corresponding frame image from images buffered in the buffer 130 by considering a shutter lag and transmits it to the selector 510, and the selector 510 transmits the output of the buffer 130 to the preprocessor 520. The preprocessor 520 preprocesses the frame image in the above method and outputs it to the postprocessor 540. The control unit 100 transmits photographing information (containing first and second photographing information) corresponding to the processed frame image to the postprocessor 540. The postprocessor 540 post-processes the frame image output by the buffer 130 by performing color interpolation, noise reduction, gamma correction, and image transformation by using the photographing information. The compression encoder 550 encodes and stores the image output by the postprocessor 540. Here, the postprocessor 540 may output a YUV image, and the compression encoder 550 may be a JPEG encoder generating a still image. In the exemplary embodiment of the present invention, the still image of JPEG (Joint Photographic Expert Group) format is described as an example, however the still image may be generated by using another encoding method for example, TIFF (Tagged Image File Format).

When processing the still image, photographing information transmitted to the postprocessor 540 is photographing information corresponding to a frame image being processed as described in FIGS. 2 and 3, and thereby the postprocessor 540 can tune the still image to an optimum condition as the photographing information corresponding at the time of capturing an image is processed.

Figure 6:
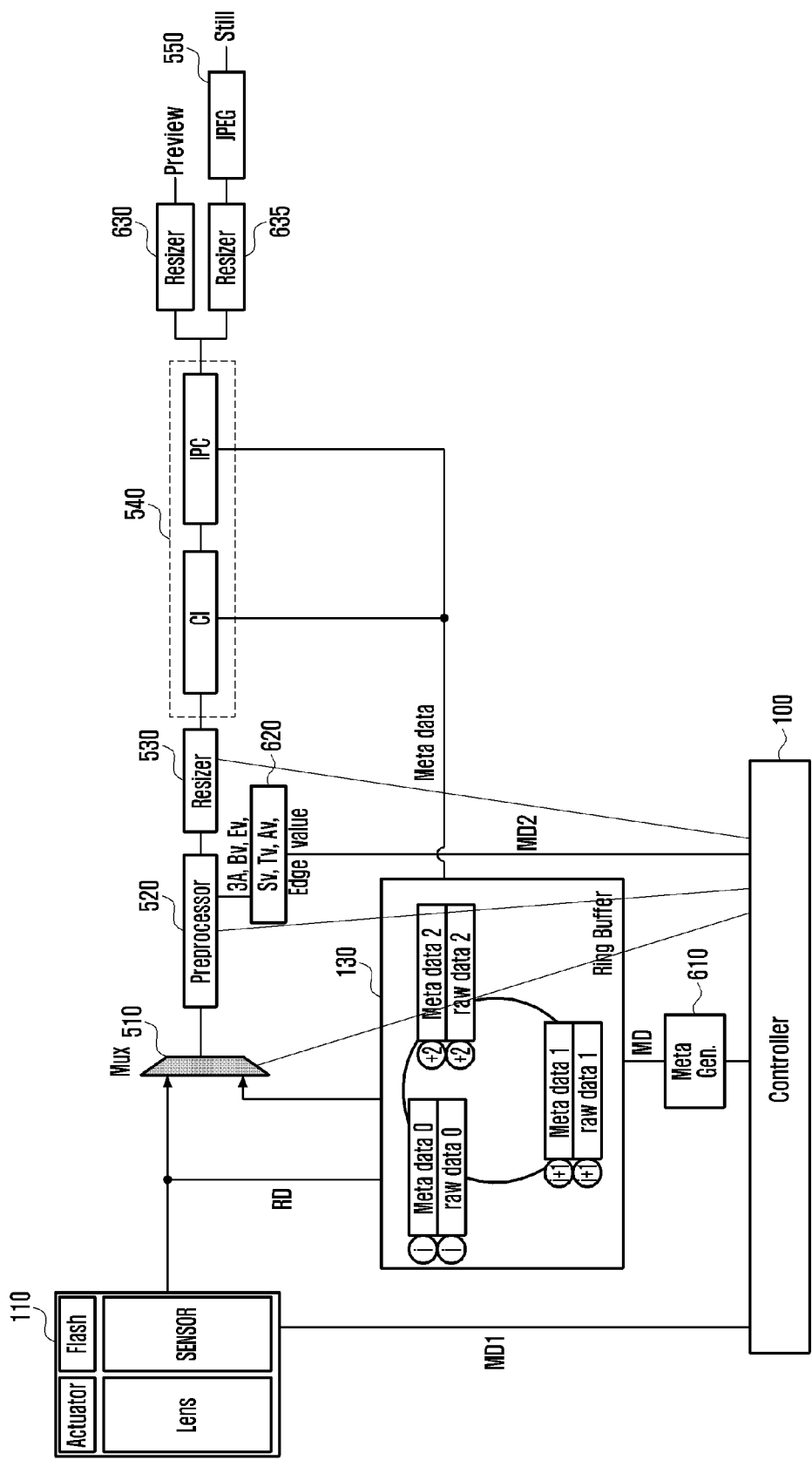
FIG. 6 is a block diagram showing a detailed configuration of a camera device according to the first exemplary embodiment of the present invention.

FIG. 6 is a block diagram showing a detailed configuration of a camera device according to the first exemplary embodiment of the present invention.

Referring to FIG. 6, the camera 110 includes a lens, sensor, actuator, and flashlight as shown in FIG. 4, and the image processor 120 includes a plurality of ring buffers storing raw data, preprocessor, postprocessor, and resizer for changing an image size. In the camera device having the above configuration, the control unit 100 controls the camera 110 by outputting first photographing information, which may include control information such as an exposure time (Tv), gains (analog gain and digital gains), and frame rate so that a sensor can operate with an automatic brightness function. If an aperture is installed in the camera 110, the first photographing information may include aperture stops (Av) information. If an autofocus function is provided, the first photographing information may include information needed for optimally focusing and driving a flash light. When the autofocus function is performed, the control unit 100 obtains information of a lens location and an operation state of the flash light as first photographing information.

While the sensor is operative to obtain an image, the camera 110 driven according to the first photographing information output by the control unit 100 measures the time of outputting an image and the time of passing a time stamp block for every frame, indexes a frame counter block for every frame, and increases an index number by 1 whenever the frame is increased. The camera 110 outputs the time stamp and frame counter to the control unit 100 as first photographing information. Here, the control unit 100 may process the first photographing information by allocating to a system memory, register, or variable. While photographing an image, the control unit 100 may further set information of a corresponding frame obtained from various sensors such as a gyro sensor to the first photographing information. The control unit 100 transmits the first photographing information of the corresponding frame obtained as above to a photographing information generator 610, and the photographing information generator 610 stores the first photographing information in the buffer 130 in which a corresponding frame image is stored.

The control unit 100 may include a buffer controller (for example, DMA controller). In this case, the buffer controller stores an image output by the camera 110 in a corresponding frame image buffer of the buffer 130, and the first photographing information output by the photographing information generator 610 may also be stored in the corresponding frame image buffer. Here, a function of passing or blocking data input in the ring buffer 130 may be performed.

While driving the camera, the control unit 100 performs a preview mode and transmits an image output by the camera 110 to the preprocessor 520 by controlling the selector 510. The control unit 100 further controls the scaler 530 and postprocessor 540 to process a display image. Here, the compression encoder 550 is controlled not to operate.

Accordingly, in the preview mode, a frame image output by the camera 110 passes the selector 510 and is transmitted to the preprocessor 520. The preprocessor 520 performs a function of preprocessing the image obtained from the camera 110. Here, the function of preprocessing the image may include extracting and processing of 3A (AWB (auto white balance), AE (auto exposure), and AF (auto focusing)), lens shading correction, dead pixel correction, and knee correction. The preprocessor 520 obtains second photographing information while performing the preprocessing. The second photographing information may include an internal lens shading correction parameter of the preprocessor 520, brightness information (Bv, Ev) obtained from 3A statics, high-frequency information of an image. An AF filter value may be used as the high-frequency information of the image. Alternatively, the high-frequency information may be obtained from a whole image, from a block or line divided into a plurality of areas, or from a specific area. The second photographing information further includes white balance gain (red and blue gains) used in white balancing.

The second photographing information is transmitted to the photographing information generator 230 through the second photographing information obtainer 620, and the photographing information generator 230 stores it in a corresponding frame image buffer of the buffer 130. Here, the first photographing information and the second photographing information may be obtained from different frame sections as shown in FIG. 3, and the first and second photographing information obtained from different frame sections must be stored with a corresponding frame image of the buffer 130. For obtaining the first and second photographing information, a method of storing by integrating the first and second frame or a method of storing the first and second photographing information individually at the time of generation may be used as described above.

The photographing information being stored may include a Bv, Ev, Sv, Tv, Av, analog gain, digital gain, frame counter, time stamp, flash on/off, AE target, lens position, edge value, and white balance gain, which are integrated and stored with the same index as that of an image (raw data) in a corresponding frame buffer of the buffer 130 as described above.

The image preprocessed by the preprocessor 520 may be a full resolution image of the camera 110, and transmitted to the scaler 530 for scaling to a display image size. Here, a resizing method may be used.

The postprocessor 540 includes a color interpolator and an IPC (image processing chain), and post-processes the preprocessed image by using the photographing information. Firstly, the color interpolator performs a color interpolation function converting the image data (Bayer data) output by the camera 110 to a color image. The image sensor of the camera 110 may be a CCD sensor or a CMOS sensor. Here, the CCD and CMOS image sensor use a color filter array, and thereby each pixel sensor has only one of 3 color channels to make a color image. The color interpolator performs a function of converting pixels of the image output by the camera 110 to an image including 3 colors (RGB), (i.e. full color conversion). The color interpolator performs the color interpolation function by using correlation between adjacent pixels. Generally in an image processing device, processing an image before the color interpolation is called preprocessing and processing an image after the color interpolation is called post-processing. Secondly, the IPC performs noise reduction, gamma correction, and luminance correction for the color interpolated image, and converts the post-processed image to a YUV image. Namely, the postprocessor 540 performs a function of converting the scaled image by resizing to a YUV image after color interpolation and post-processing.

The post-processed image is resized to an image size suitable for displaying in the display unit (not shown) and output by the scaler 530, and the display unit displays the image output by the image processor 120 as a preview image.

In the preview mode, the camera device obtains photographing information, stores the obtained photographing information and corresponding image, performs the image processing for every frame, and displays the output of the image processor 120 in the display unit as a preview image. Accordingly, the buffer 130 always stores a predetermined number of frame images and photographing information during the preview mode.

If a user requests for capturing an image in the above state, the control unit 100 controls the selector 510 to transmit an image output by the buffer 130 to the preprocessor 520, and controls the scaler 530 to resize and transmit the image to the postprocessor 540. For example, under the control of the control unit 100, the scaler 530 transmits the output image of the preprocessor 520 to the postprocessor 540 as if the predetermined size of still image is identical to the full resolution size of the camera 110, and transmits the output image of the preprocessor 520 to the postprocessor 540 by scaling to a predetermined size if the size of still image is set by the user. The postprocessor 540 processes the still image of the size predetermined by the control of the control unit 100. The control unit 100 controls the buffer 130 so that a frame image and photographing information for generating the still image is accessed from the frame images and photographing information stored in the buffer 130. The buffer 130 then outputs the frame image selected by the control of the control unit 100 to the selector 510, and photographing information is transmitted to the postprocessor 540.

If the image and photographing information of the buffer 130 is accessed, the control unit 100 performs functions such as a zero shutter lag by retrieving or accessing an image and photographing information corresponding to a shutter-on time from the frame images and photographing information stored in the buffer 130. When photographing with a flash light, the control unit 100 selects a frame image and photographing information photographed with the flash light by analyzing the photographing information, and controls the buffer 130 to sequentially access a plurality of frame images and photographing information as if bracket photographing has been performed.

Hereinafter, an example of processing a still image by using the photographing information is described.

When processing AE bracketing and AWB bracketing in the capture mode, a sensor setting is set to a continuous frame mode, raw data applied by a setting value is stored with metadata in a ring buffer, and then the control unit 100 continuously processes images by using the meta data corresponding to the raw data.

Additionally, a JPEG compression ratio can be adjusted by using an edge value from photographing information (metadata) stored in the buffer (ring buffer). In the capture mode, an image selected by the control of the control unit 100 bypasses the selector 510 and scaler 530, an image preprocessed by the preprocessor 520 is transmitted to the postprocessor 540, and the post processor 540 post-processes the preprocessed image by using photographing information of a corresponding frame.

In the image processing operation, if an application using AE bracketing such as high dynamic range and AWB bracketing are performed while changing the sensor setting of the camera 110 continuously, the control unit 100 stores an output of bracketing by synchronizing with a termination time of the sensor of the camera 110 in order to shorten the processing time (i.e., blocks direct transmission to the image processor 120), and thereafter processes and outputs images and photographing information to the image processor 120 sequentially for frames taken by bracket photographing and stored in the buffer 130.

If the JPEG image size is limited by an edge value stored in the photographing information, a system memory can be efficiently managed by changing a Q-value setting of the compression ratio in the photographing information. Therefore, JPEG compression may be performed by one-path encoding without repeating, and the processing time becomes shorter.

Figure 7:
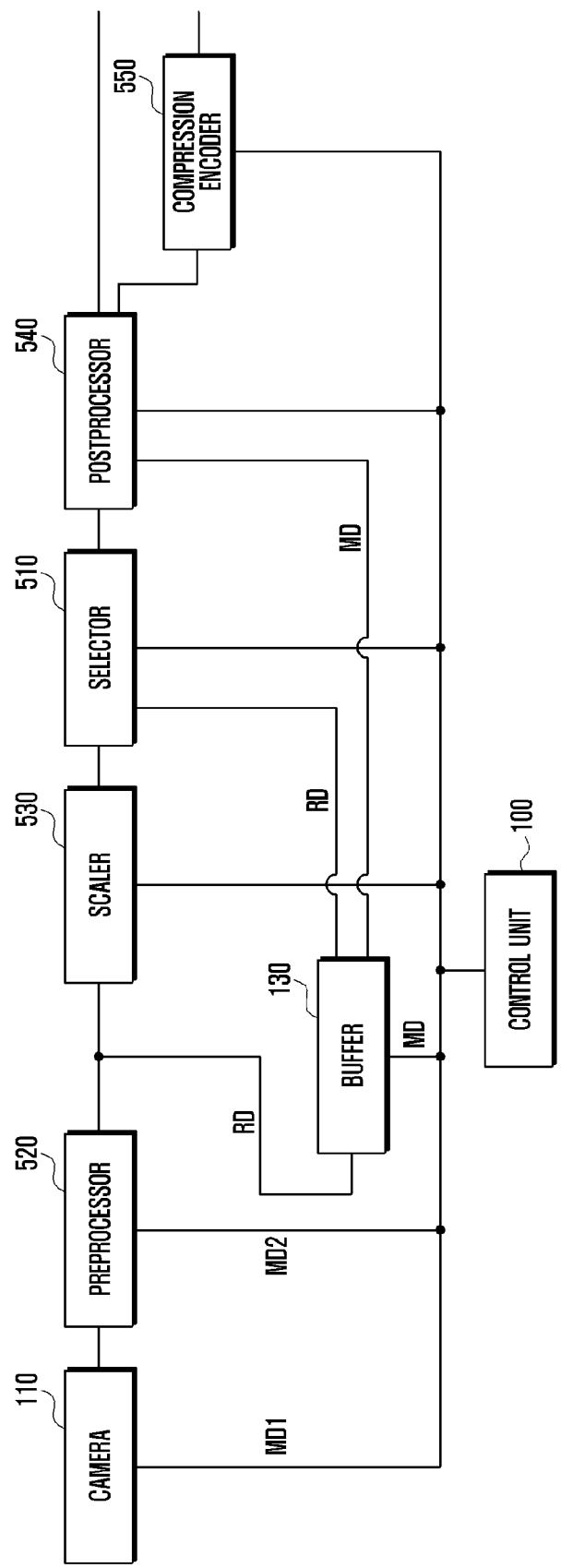
FIG. 7 is a block diagram showing a configuration of a camera device according to a second exemplary embodiment of the present invention.
Figure 8:
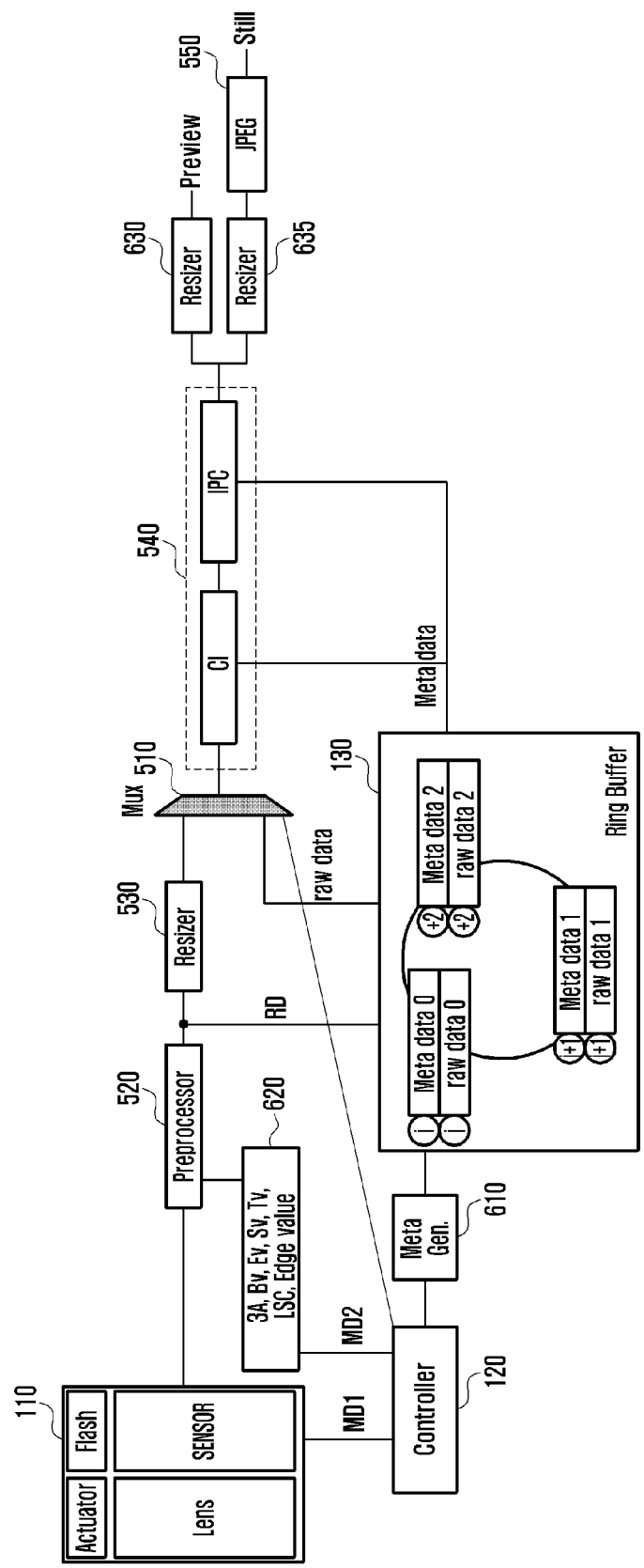
FIG. 8 is a block diagram showing a detailed configuration of the camera device according to the second exemplary embodiment of the present invention.

FIG. 7 is a block diagram showing a configuration of a camera device according to a second exemplary embodiment of the present invention, and FIG. 8 is a block diagram showing a detailed configuration of the camera device according to the second exemplary embodiment of the present invention. The camera device according to the second exemplary embodiment of the present invention has a configuration of an image processor 120 so that an image generated by the camera 110 is preprocessed by the preprocessor 520 and stored in the buffer 130.

Referring to FIGS. 7 and 8, in a preview mode, the control unit 100 controls the selector 510 so that an output of the scaler 530 is transmitted to the postprocessor 540. Accordingly, in the second exemplary embodiment of the present invention, the image stored in the buffer 130 is an image photographed by the camera 110 and preprocessed by the preprocessor 520. The control unit 100 obtains first photographing information and second photographing information in the same way as the first exemplary embodiment, and stores them with a corresponding frame image in the buffer 130. Namely, in the second exemplary embodiment, a method of obtaining the first photographing information and second photographing information, and storing them in the buffer 130, is performed in the same way as the first exemplary embodiment. Thus, the discussion of same components is omitted to avoid redundancy. The image photographed by the camera 110 is preprocessed by the preprocessor 520, scaled to a display image size by the scaler 530, and displayed as a preview image by processing through the image postprocessor 540.

In operation, if capturing an image is requested by a user, the control unit 100 controls the selector 510 to transmit an image output by the buffer 130 to the postprocessor 540. The control unit 100 further controls the buffer 130 to output a predetermined frame image and the corresponding photographing information selectively, and the image output by the buffer 130 is transmitted to the postprocessor 540 through the selector 510. The photographing information output by the buffer 130 is transmitted to the postprocessor 540. Here, the image stored in the buffer 130 is a preprocessed image. The postprocessor 540 post-processes the preprocessed image by using the photographing information responsive to the retrieved preprocessed image, and then the post-processed image is stored after being compressed and encoded by the compression encoder 550.

Figure 9:
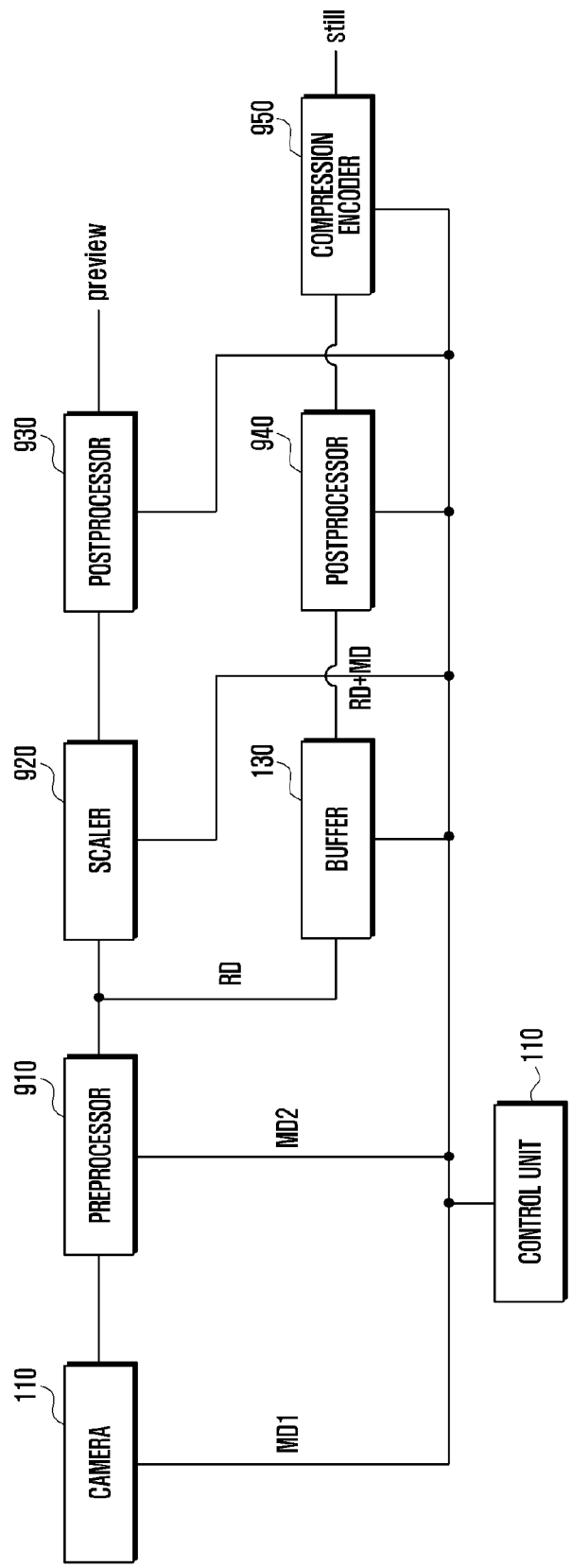
FIG. 9 is a block diagram showing a configuration of a camera device according to a third exemplary embodiment of the present invention.
Figure 10:
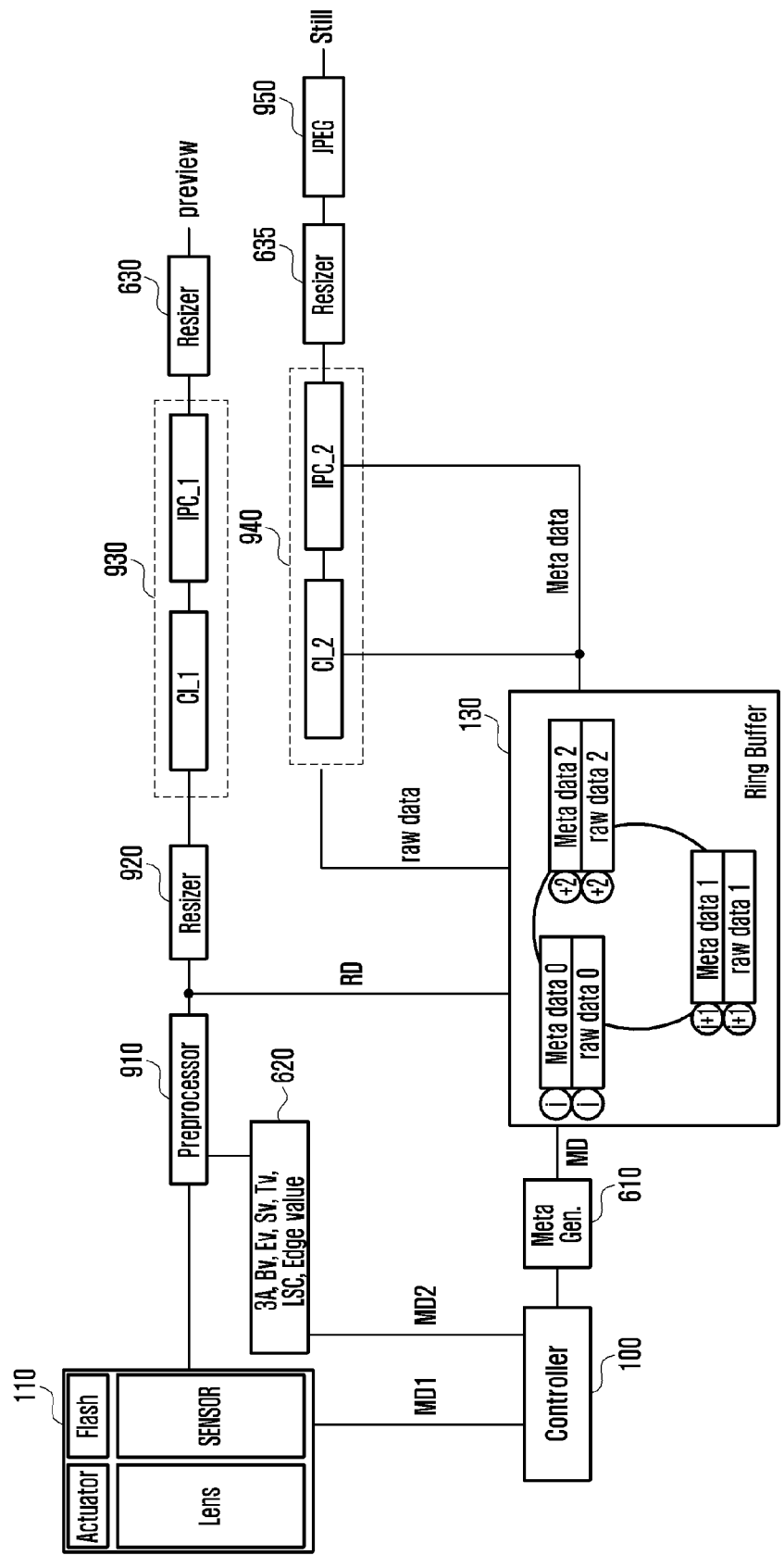
FIG. 10 is a block diagram showing a detailed configuration of the camera device according to the second exemplary embodiment of the present invention.

FIG. 9 is a block diagram showing a configuration of a camera device according to a third exemplary embodiment of the present invention and FIG. 10 is a block diagram showing a detailed configuration of the camera device according to the second exemplary embodiment of the present invention. The camera device according to the third exemplary embodiment of the present invention has a configuration of which the image processor 120 includes a component processing a display image and a component processing a still image independently.

Referring to FIGS. 9 and 10, in a preview mode, an image photographed by the camera 110 is transmitted to a preprocessor 910, and the image preprocessed by the preprocessor 910 is transmitted to a scaler 920 and stored in the buffer 130. The scaler 920 scales the preprocessed image to a display image size and the postprocessor 930 displays the image in a display unit (not shown) by post-processing the image scaled to a display image size. The control unit 100 obtains first photographing information and second photographing information in the same way as the first and second exemplary embodiment, and stores them with a corresponding frame image in the buffer 130. Here, the discussion of same components is omitted to avoid redundancy. Namely, in the third exemplary embodiment, obtaining the first and second photographing information, and storing them in the buffer 130 are performed in the same method as operations of the first and second exemplary embodiment.

In operation, if capturing an image is requested by a user, the control unit 100 controls the buffer 130 to output a frame image and the corresponding photographing information selectively, and the frame image and photographing information output by the buffer 130 is transmitted to a postprocessor 940. Here, the image stored in the buffer 130 is a preprocessed image, the postprocessor 940 post-processes the preprocessed image by using the photographing information, and the post-processed image is stored after being compressed and encoded by a compression encoder 950. The postprocessor 930 post-processes the display image, and can post-process a still image having the full resolution of the camera 110.

Figure 11:
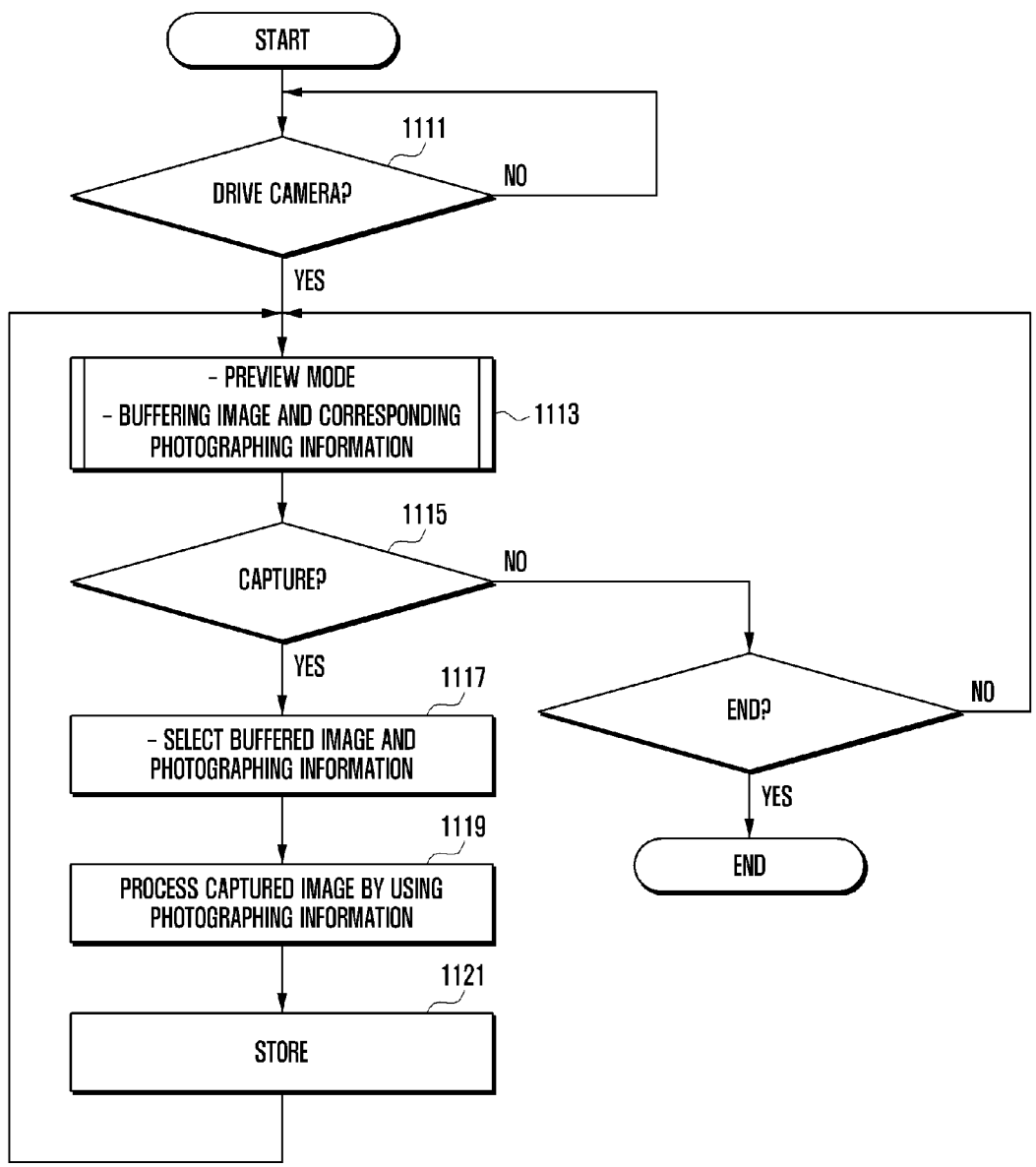
FIG. 11 is a flow chart showing a procedure of processing an image photographed by a camera of a camera device according to an exemplary embodiment of the present invention.
Figure 12:
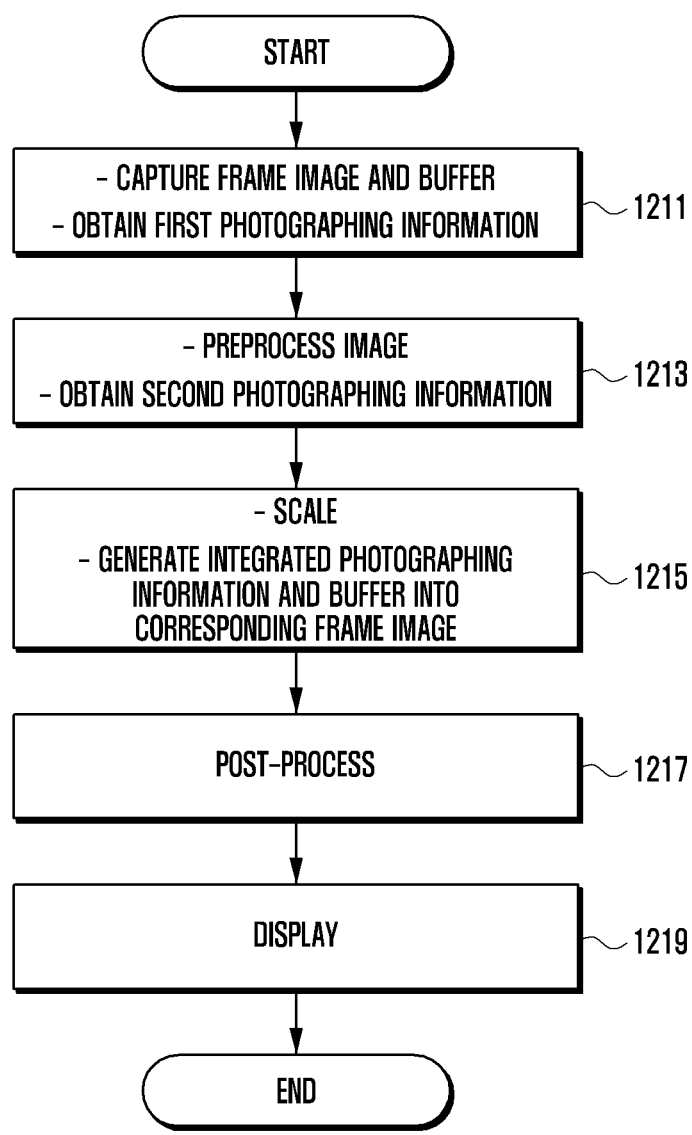
FIG. 12 is a flow chart showing a procedure of processing an image and photographing information in a preview mode of a camera device according to an exemplary embodiment of the present invention.

FIG. 11 is a flow chart showing a procedure of processing an image photographed by a camera of a camera device according to an exemplary embodiment of the present invention, and FIG. 12 is a flow chart showing a procedure of processing an image and photographing information in a preview mode of a camera device according to an exemplary embodiment of the present invention.

Referring to FIGS. 11 and 12, if a user switches on a shutter, the control unit 100 detects a camera drive (1111), and displays a preview image by performing a preview mode (1113). In the preview mode, the control unit 100 obtains photographing information for driving the camera 110 and photographing information output by the camera 110 as first photographing information, and also obtains photographing information in processing an image by the image processor 120 as second photographing information. The control unit 100 stores an image photographed by the camera 110 in the buffer 130, and stores first and second photographing information obtained from the same frame of the stored image.

Hereinafter, an operation of the preview mode is described referring to FIG. 12. The control unit 100 buffers the image photographed by the camera 110 in the buffer 130 (1211), and obtains photographing information for controlling the drive of the camera 110 and photographing information output by the camera 110 as first photographing information. Here, the first photographing information may include an exposure time (Tv), gains (analog gain and digital gain), information for controlling a frame rate, aperture stops (Av) information, focus information, flash drive information, lens location information, time stamp and frame counter output by the camera 110, and information of sensors such as a gyro sensor. Here, the first photographing information may be stored with a corresponding frame image in the buffer 130 or stored with second photographing information through integrating of both information.

Subsequently, the control unit 100 processes the image output by the camera 110. The image is preprocessed by the image processor 120, and second photographing information is obtained in this process (1213). Here, the second photographing information may include a lens shading correction parameter, brightness information (Bv, Ev) obtained from 3A statics, high-frequency information of an image, and white balance gain (red and blue gain) used in white balancing. The control unit 100 stores the second photographing information next to the first photographing information of the corresponding frame if the first photographing information is already stored with the frame image. Alternatively or additionally, if the first photographing information is not stored at that time, the second photographing information is integrated with the first photographing information and stored in a frame image area. The photographing information may be processed with an image in a capture mode, and may be used in post-processing of the image.

Subsequently, the control unit 100 scales the preprocessed image to a display image size and stores the obtained first photographing information and second photographing information in the buffer 130 by integrating (1215). Here, the integrated photographing information may be stored at a buffer location where a corresponding frame image is stored. Namely, the first photographing information and second photographing information are generated in different frame sections, however in the exemplary embodiment of the present invention, the photographing information is stored with a corresponding frame image at a location where the frame image (or same frame) is stored. Then, both photographing information may be processed with an image during a capture mode, and is used for post-processing of the image.

The control unit 100 controls to post-process the image scaled to a display image size (1217), and controls to display a preview image by outputting the post-processed image (1219).

Such a preview mode is repeated until a capture mode is requested after driving the camera or the drive of the camera is terminated. If capturing an image is requested in the preview mode, the control unit 100 detects it (1115), and controls the buffer 130 to selectively output the image and photographing information according to the request for capturing (1117). Here, the image may be a frame image of zero shutter lag, a frame image photographed with a flash light driven according to the photographing information, or a plurality of frame images taken by bracket photographing. The control unit 100 controls so that the frame image output by the buffer 130 is processed by the image processor 120 and at the same time controls to transmit photographing information of a corresponding frame to the image processor 120 so that the image is processed by using the photographing information (1119). Here, the image being processed may be a still image, and the control unit 100 stores the processed image in a storage unit after compressing and encoding (1121).

Figure 13:
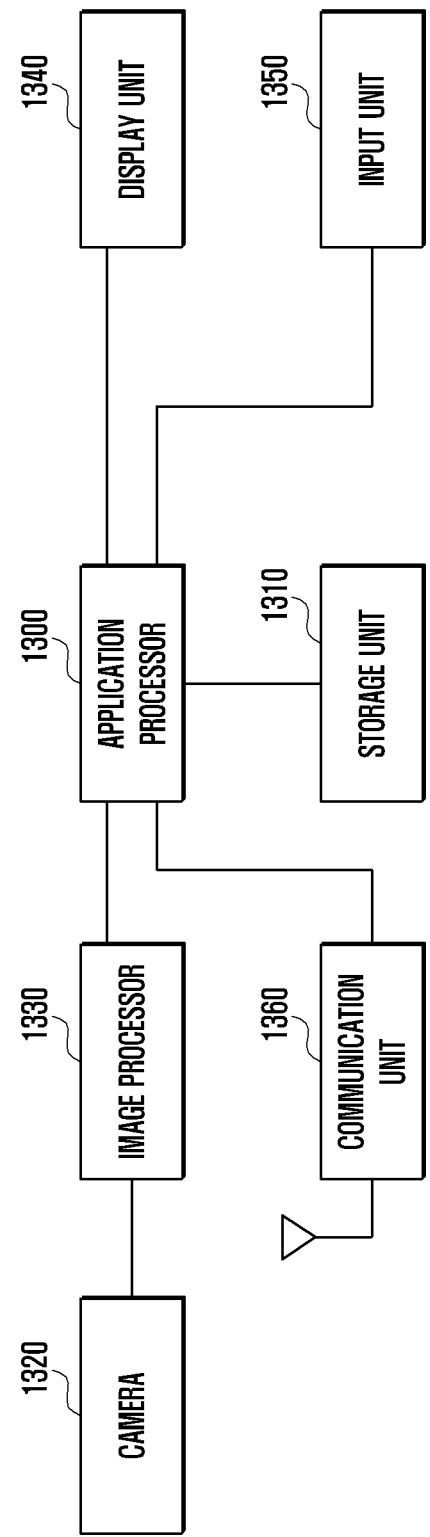
FIG. 13 is a block diagram showing a configuration of a portable terminal using an image processing method according to an exemplary embodiment of the present invention.
Figure 14:
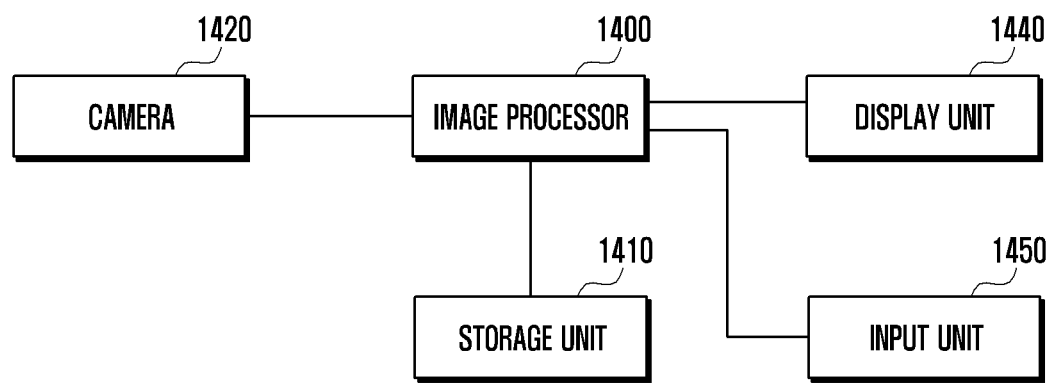
FIG. 14 is a block diagram showing a configuration of a camera device using an image processing method according to another exemplary embodiment of the present invention.

The above image processor can be used also in a portable terminal having a camera and a camera device. FIG. 13 is a block diagram showing a configuration of a portable terminal using an image processing method according to an exemplary embodiment of the present invention, and FIG. 14 is a block diagram showing a configuration of a camera device using an image processing method according to the exemplary embodiment of the present invention.

FIG. 13 shows is a block diagram showing a configuration of a portable terminal using an image processing method according to an exemplary embodiment of the present invention.

An image processor 1330 generates a display image for displaying in a display unit 1340 and a captured image to be stored according to a request for capturing an image by processing the image obtained by the camera 1320. Here, the display image may be a YUV image, and the captured image may be an image compressed and encoded in a JPEG format. The image processor 1330 scales the image obtained by the camera 1320 to an appropriate image size for displaying in the display unit 1340, and converts to the YUV image so that the image can be displayed in the display unit 1340. The image processor 1330 buffers a full resolution image output by the camera 1320, and compresses and encodes a selected frame image which can compensate a shutter delay time when the shutter is switched on or activated. Here, the captured image may be an image having the full resolution of the camera 1320. The image processor 1330 generates the display image for every frame, and buffers the captured image. When buffering the captured image, first photographing information and second photographing information obtained from the captured image frame are stored with the corresponding captured image, i.e., in an identical frame.

An application processor 1300 buffers a display image generated by the image processor 1330 while driving the camera, and buffers the display image and the captured image if capturing an image is requested. The application processor 1300 controls to display the buffered display image in the display unit 1340, and stores the captured image in a storage unit 1310 if capturing an image is requested.

An input unit 1350 generates a camera drive command and a capture command for the application processor 1300. The display unit 1340 displays the display image output by the application processor 1300 in a preview mode. Here, the input unit 1350 may be a touch panel detecting a user's touch input and the display unit 1340 may be an LCD or OLED panel displaying data and images generated during execution of a program. Here, the input unit 1350 and the display unit 1340 may be configured with a touch screen of an integrated type. The input unit 1350 may further include buttons disposed at the outside of the portable terminal.

The storage unit 1310 stores the captured image output by the application processor 1300 if capturing an image is requested. In the portable terminal having the above configuration, the application processor 1300 may include a communication unit 1360. The communication unit 1360 performs a communication function with an external device or with a base station. The communication unit 1360 may include a frequency up-converter converting a transmitting signal to an RF band, a transmitter having an electric amplifier, amplifier low-noise amplifying the received RF signal, frequency down-converter converting the RF signal to a baseband, modulator outputting the transmitting signal to the transmitter by modulating, and demodulator demodulating the signal output by a receiver. Here, the modulator and the demodulator may be one of a WCDMA, GSM, and LTE according to a communication method, or may be a modulator/demodulator such a WIFI, WIBRO, and their combinations. If the communication unit 1360 is installed, the application processor 1300 may be configured with a mobile processor (MP) and an application processor.

FIG. 14 shows a block diagram showing a configuration of a camera device using an image processing method according to another exemplary embodiment of the present invention.

An image processor 1400 generates a display image for displaying in a display unit 1440 and a captured image to be stored if capturing an image is requested, by processing an image obtained by the camera 1420. Here, the display image may be a YUV image, and the captured image may be an image compressed and encoded in a JPEG format. The image processor 1400 scales the image obtained by the camera 1420 to an image size for displaying in the display unit 1440, and converts the image to the YUV image so as to be displayed in the display unit 1440. The image processor 1400 buffers a full resolution image output by the camera 1420, and compresses and encodes a selected frame image which can compensate a shutter delay time when the shutter is switched on and store the image in the storage unit 1410. Here, the captured image may be an image having the full resolution of the camera 1420. The image processor 1400 generates the display image for every frame and displays it through the display unit 1440. When buffering the captured image, first photographing information and second photographing information obtained from the captured image frame are buffered with the corresponding image or the same captured frame.

An input unit 1450 generates a camera drive command and a capture command under the control of the image processor 1400. The display unit 1440 displays the display image output by the image processor 1400 in a preview mode. Here, the input unit 1450 may be a touch panel detecting a user's touch input and the display unit 1440 may be an LCD or OLED panel displaying data and images generated during execution of a program. Here, the input unit 1450 and the display unit 1440 may be configured with a touch screen of an integrated type. The input unit 1450 may further include buttons disposed at the outside of the portable terminal.

A storage unit 1410 stores a captured image output by the image processor 1400 if capturing an image is requested. In a portable terminal having the configuration of FIG. 13 and a camera device having the configuration of FIG. 14, the image processors 1330 and 1400 may have the configurations of FIG. 5, 7, or 9. In a preview mode, the image processors 1330 and 1400 buffer frame images and obtain first photographing information and second photographing information related to the corresponding buffered frame images at the same time. Here, the first photographing information is photographing information related to the control and operation of the camera 1320 and the second photographing information is photographing information obtained in the image processing. When processing a preview image in a preview mode, the image processors 1330 and 1400 store a full resolution image of the camera and photographing information which will be used in a capture mode. The photographing information includes first photographing information obtained from a corresponding frame image related to the drive of camera and second photographing information obtained by the image processors. Here, the first photographing information and second photographing information are obtained from an identical frame image but from different frame sections due to the delay of frame as described above. In the exemplary embodiment of the present invention, the photographing information is integrated and buffered with a corresponding frame image in an identical frame area of the buffer. When processing the buffered image in a capture mode, image processing may be performed by using photographing information stored with the image (i.e. photographing information obtained from an identical frame).

Having thus described a preferred embodiment of a method for processing an image, it should be apparent to those skilled in the art that certain advantages of the system have been achieved. The foregoing is to be constructed as only being an illustrative embodiment of this invention.

Further, the above-described methods according to the principles of present disclosure can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be understood that many variations and modifications of the basic inventive concept described herein will still fall within the spirit and scope of the present invention as defined in the appended claims.

What is claimed is:

1. An apparatus for processing an image, comprising:
    a camera capturing an image according to first photographing information;
    a buffer storing a plurality of frame images;
    an image processor processing the image captured by the camera during a preview mode and obtaining second photographing information when processing the image captured by the camera; and
    a control unit outputting the first photographing information during the preview mode, storing the first photographing information and the second photographing information with the corresponding frame image in the buffer, and outputting a predetermined frame image and the corresponding first and second photographing information to the image processor during a capture mode,
    wherein the second photographing information is generated from a frame section of the corresponding frame image that is different from a frame section of the corresponding frame image that the first photographing information is generated from, wherein the buffer is a ring buffer having a plurality of frame buffers for storing the plurality of frame images and each of the plurality of frame buffers stores a specific frame image and the corresponding first and second photographing information, and wherein the control unit controls to integrate the first and second photographing information for a specific frame image and stores the integrated photographing information in the corresponding frame buffer and controls to output the integrated photographing information and the corresponding frame image for a predetermined frame buffer to the image processor during the capture mode.

2. The apparatus of claim 1, wherein the control unit includes a photographing information generator integrating the first photographing information and the second photographing information for storage in the buffer.

3. The apparatus of claim 2, wherein the first photographing information includes an exposure time, gain, flash drive information of the camera, and the second photographing information includes brightness information and white balance information.

4. The apparatus of claim 3, wherein the first photographing information farther includes a time stamp and a frame counter output by the camera.

5. The apparatus of claim 1, wherein the predetermined frame buffer stores a frame image of zero shutter lag and photographing information.

6. The apparatus of claim 1, wherein the predetermined frame buffer stores flash-on information.

7. The apparatus of claim 1, wherein the predetermined frame buffer stores images photographed with continuous bracket photographing and photographing information.

8. The apparatus of claim 1, wherein the image processor comprises:
a preprocessor preprocessing the image and extracting the second photographing information during a preprocessing operation;
a scaler scaling the preprocessed image into a predefined display image size; and
a postprocessor post-processing the image by color interpolation and color transformation, wherein the preprocessor preprocesses an image of the predetermined frame buffer, and the postprocessor post-processes the preprocessed image by using the first and second photographing information during a capture mode.

9. The apparatus of claim 1, wherein the image processor comprises:
a preprocessor storing the image in the buffer by preprocessing the image and extracting the second photographing information in a preprocessing operation;
a scaler scaling the preprocessed image into the size of a display image; and
a postprocessor post-processing the image by color interpolation and color transformation, wherein the preprocessor, scaler, and postprocessor generate the preview image under the control of the control unit during the preview mode, and the postprocessor post-processes an image output by the buffer by using the first and second photographing information during a capture mode.

10. The apparatus of claim 1, wherein the image processor comprises:

a preprocessor storing the image output by the camera in the buffer by preprocessing the image and extracting the second photographing information during a preprocessing operation;
a scaler scaling the preprocessed image into the size of a display image;
a first postprocessor post-processing the scaled image by color interpolation and color transformation; and
a second postprocessor post-processing an image output by color interpolation and color transformation, wherein the preprocessor, scaler, and first postprocessor generate a preview image under the control of the control unit during the preview mode, and the second postprocessor post processes the image output by the buffer by using the first and second photographing information during the capture mode.

11. A method for processing an image in a camera device, comprising:
processing a preview image in which first photographing information for controlling a camera drive during a preview mode and second photographing information obtained when processing the preview are obtained;
storing the first and second photographing information in a corresponding frame image of a buffer, wherein the second photographing information is generated from a frame section of the corresponding frame image that is different from a frame section of the corresponding frame image that the first photographing information is generated from, wherein the buffer is a ring buffer having a plurality of frame buffers for storing the plurality of frame images and each of the plurality of frame buffers stores a specific frame image and the corresponding first and second photographing information, and wherein the control unit controls to integrate the first and second photographing information for a specific frame image and stores the integrated photographing information in the corresponding frame buffer and controls to output the integrated photographing information and the corresponding frame image for a predetermined frame buffer to the image processor during the capture mode; and
processing a still image in which a specific frame image selected from the buffer is processed by using the first and second photographing information during a capture mode.

12. The method of claim 11, wherein processing the preview image comprises:
storing an image of each frame section output by the camera and obtaining camera control information related to the image as the first photographing information;
obtaining the second photographing information when processing the image output by the camera; and
storing the first and second photographing information for a particular frame image output by the camera in the buffer, wherein the buffer is configured with a plurality of frame buffers storing each frame image and the corresponding first and second photographing information.

13. The method of claim 12, wherein processing the still image comprises:
outputting a frame image selected from the buffer and processing a still image by using the first and second photographing information associated with the selected frame image; and
storing the processed still image by compression encoding operation.

14. The method of claim 13, wherein the first photographing information includes an exposure time, gain, flash drive information of the camera, and the second photographing information includes a BY, Ev, and white balance.

15. The method of claim 14, wherein the first photographing information further includes a time stamp and a frame counter output by the camera.

16. The method of claim 12, wherein the first and second photographing information are integrated and stored in the buffer.

17. The method of claim 13, wherein the selected frame is a frame image of zero shutter lag at the time of requesting a capture of the image.

18. The method of claim 13, wherein the selected frame includes flash-on information in the first photographing information.

19. The method of claim 13, wherein the selected frame includes images photographed with continuous bracket photographing and photographing information.

20. The method of claim 11, wherein processing the preview image comprises:
   storing the preview image obtained by the camera and with the corresponding first photographing information in a frame buffer;
   storing the second photographing information in the same frame buffer;
   scaling the preprocessed image into a predefined display image size;
   post-processing a still image using the first and second photographing information retrieved from the same frame buffer; and
   storing the post-processed still image by compression encoding.

21. The method of claim 11, wherein processing the preview image comprises:
   obtaining the first photographing information by driving the camera;
   preprocessing the preview image to obtain the second photographing information;
   storing the preprocessed image, the first photographing information, and the second photographing information in a specific frame buffer;
   scaling the preprocessed image into a predefined display image size;
   post-processing a still image by selecting a frame buffer;
   post-processing an image of the selected frame buffer by using the first and second photographing information; and storing the post-processed image as a still image by compression encoding.

22. An apparatus for processing an image in a portable terminal having a display, comprising:
   a camera, capturing an image according to first photographing information;
   a buffer for storing a plurality of frame images output by the camera;
   an image processor, operatively coupled to the buffer, configured for processing the image output by the camera during a preview mode, obtaining second photographing information from processing the image, storing a specific frame image with the corresponding first and second photographing information in the buffer, and processing a still image by using the first and second photographing information of a corresponding frame image during a capture mode; and
   a controller controlling the preview mode and the capture mode of the image processor and controlling the display to display an image output by the image processor;
   wherein the second photographing information is generated from a frame section of the corresponding frame image that is different from a frame section of the corresponding frame image that the first photographing information is generated from,
   wherein the buffer is a ring buffer having a plurality of frame buffers for storing the plurality of frame images and each of the plurality of frame buffers stores a specific frame image and the corresponding first and second photographing information, and
   wherein the control unit controls to integrate the first and second photographing information for a specific frame image and stores the integrated photographing information in the corresponding frame buffer and controls to output the integrated photographing information and the corresponding frame image for a predetermined frame buffer to the image processor during the capture mode.

23. An apparatus for processing an image, comprising:
   a camera capturing an image according to first photographing information;
   an input unit generating signals of a preview mode and a capture mode;
   an image processor, operatively coupled to a buffer, configured for storing a plurality of frame images, obtaining second photographing information when processing the image output by the camera during a preview mode, storing a specific frame image with the first and second photographing information in the buffer, and processing the image output by the buffer to a still image by using the first and second photographing information of a corresponding frame image during a capture mode, wherein the second photographing information is generated from a frame section of the corresponding frame image that is different from a frame section of the corresponding frame image that the first photographing information is generated from, wherein the buffer is a ring buffer having a plurality of frame buffers for storing the plurality of frame images and each of the plurality of frame buffers stores a specific frame image and the corresponding first and second photographing information, and wherein the control unit controls to integrate the first and second photographing information for a specific frame image and stores the integrated photographing information in the corresponding frame buffer and controls to output the integrated photographing information and the corresponding frame image for a predetermined frame buffer to the image processor during the capture mode;
   a storage unit storing the still image output by image processor; and
   a display unit displaying the still image under the control of the image processor.

* * * * *